US010262543B2

(12) United States Patent
Esposito et al.

(10) Patent No.: US 10,262,543 B2
(45) **Date of Patent: *Apr. 16, 2019**

(54) COLLABORATIVE AVIATION INFORMATION COLLECTION AND DISTRIBUTION SYSTEM

(71) Applicant: HONEYWELL INTERNATIONAL INC., Morris Plains, NJ (US)

(72) Inventors: Carl Esposito, Phoenix, AZ (US); Kristen J. Law, Phoenix, AZ (US); David B. Goldstein, Washington, NJ (US); Kenneth R. Jongsma, Tijeras, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,392

(22) Filed: Jul. 17, 2017

(65) Prior Publication Data

US 2017/0316700 A1 Nov. 2, 2017

Related U.S. Application Data

(63) Continuation of application No. 14/322,437, filed on Jul. 2, 2014, now Pat. No. 9,786,185.

(Continued)

(51) Int. Cl.

*G01C 23/00* (2006.01)
*G05D 1/00* (2006.01)

(Continued)

(52) U.S. Cl.

CPC ........... *G08G 5/0008* (2013.01); *G08G 5/003* (2013.01); *G08G 5/0004* (2013.01);

(Continued)

(58) Field of Classification Search

CPC .. G08G 5/0008; G08G 5/0004; G08G 5/0013; G08G 5/0017; G08G 5/003;

(Continued)

(56) References Cited

U.S. PATENT DOCUMENTS

| | | | |
|---|---|---|---|
| 8,645,148 | B2 | 2/2014 | Small et al. |
| 8,743,020 | B1 | 6/2014 | Mazuk |

(Continued)

FOREIGN PATENT DOCUMENTS

| | | | |
|---|---|---|---|
| CN | 201788592 | U | 4/2011 |
| CN | 102682626 | A | 9/2012 |

(Continued)

OTHER PUBLICATIONS

Extended EP search report for EP15154770.0-1803 dated Jul. 7, 2015.

(Continued)

*Primary Examiner* — Mahmoud S Ismail

(74) *Attorney, Agent, or Firm* — Lorenz & Kopf, LLP

(57) ABSTRACT

A collaborative aviation information collection and distribution system includes a plurality of aircraft data transmitters and an aircraft data processing system. Each aircraft data transmitter is configured to selectively transmit aircraft data associated with a subscribing aircraft. The aircraft data processing system is in operable communication with each of the aircraft data transmitters and includes a data receiver, a data transmitter, and a data processor. The data receiver receives aircraft data transmitted from each of the aircraft transmitters. The data transmitter selectively transmits actionable aircraft data to one or more of the subscribing aircraft or subscribing ground-based users. The data processor determines which of, and when, the one or more subscribing aircraft or subscribing ground-based users should receive actionable aircraft data, generates actionable aircraft (Continued)

data from at least a portion of the received aircraft data, and supplies the generated actionable aircraft data to the data transmitter for transmission.

19 Claims, 2 Drawing Sheets

Related U.S. Application Data

(60) Provisional application No. 61/944,257, filed on Feb. 25, 2014.

(51) Int. Cl.

| | |
|---|---|
| ***G05D 3/00*** | (2006.01) |
| ***G06F 7/00*** | (2006.01) |
| ***G06F 17/00*** | (2006.01) |
| ***G08G 5/00*** | (2006.01) |
| *G06F 7/70* | (2006.01) |
| *G06F 19/00* | (2018.01) |
| *G06G 7/00* | (2006.01) |
| *G06G 7/76* | (2006.01) |
| *G08G 1/00* | (2006.01) |
| *G08G 5/02* | (2006.01) |
| *G07C 5/00* | (2006.01) |

(52) U.S. Cl.

CPC ......... *G08G 5/0013* (2013.01); *G08G 5/0017* (2013.01); *G07C 5/008* (2013.01); *G08G 5/0039* (2013.01); *G08G 5/0078* (2013.01); *G08G 5/0091* (2013.01); *G08G 5/025* (2013.01)

(58) Field of Classification Search

CPC .......... G08G 1/00; G07C 5/008; G01C 21/00; G06F 17/00; G08B 21/00

USPC ................................ 701/3, 14, 467; 340/901

See application file for complete search history.

(56) References Cited

U.S. PATENT DOCUMENTS

| | | | | |
|---|---|---|---|---|
| 2009/0012663 | A1* | 1/2009 | Mead | G01W 1/10 701/14 |
| 2009/0292483 | A1 | 11/2009 | Journade et al. | |
| 2011/0050458 | A1* | 3/2011 | Bailey | G08G 5/0013 340/901 |
| 2012/0262306 | A1 | 10/2012 | Edwards et al. | |
| 2013/0066515 | A1 | 3/2013 | Sudolsky et al. | |
| 2013/0085669 | A1* | 4/2013 | Bailey | G08G 5/0039 701/467 |

FOREIGN PATENT DOCUMENTS

| | | | |
|---|---|---|---|
| CN | 102682628 | A | 9/2012 |
| EP | 2575120 | A2 | 4/2013 |
| EP | 2595136 | A2 | 5/2013 |

OTHER PUBLICATIONS

Tipps, D.O. et al.; Statistical Loads Data for the Boeing 777-200ER Aircraft in Commercial Operations; DOT/FAA/AR-06/11; Office of Aviation Research and Development; Nov. 2006 Final Report.

Kreifeldt, J.G.; Cockpit Displayed Traffic Information and Distributed Management in Air Traffic Control; SAGE Journals; Human Factors: The Journal of the Human Factors and Ergonomics Society; Dec. 1980, vol. 22 No. 6 671-691.

Chinese Office Action for Application No. 201510145138.5 dated Aug. 29, 2018.

* cited by examiner

COLLABORATIVE AVIATION INFORMATION COLLECTION AND DISTRIBUTION SYSTEM

CROSS-REFERENCE TO RELATED APPLICATION

This application is a continuation of application Ser. No. 14/322,437, filed Jul. 2, 2014, now U.S. Pat. No. 9,786,185, which claims the benefit of U.S. Provisional Application No. 61/944,257, filed Feb. 25, 2014.

TECHNICAL FIELD

The present invention generally relates to aviation information collection and distribution, and more particularly relates to a system for collaboratively collecting and distributing aviation information.

BACKGROUND

Current aircraft information systems such as weather, distributed turbulence collection and modeling, real time winds and temperatures aloft, flight operations, maintenance system, condition monitoring, airplane-on-ground (AOG) reporting, engine status, fuel usage, pilot logs, and Electronic Flight Bag (EFB) collection systems are operator focused. There is limited incentive to install aircraft and weather information collection equipment onboard operators' aircraft and transmit this information to the ground. This is due, at least in part, to the relatively high cost associated with equipment installation and data transmission. Moreover, the information obtained from a fleet of aircraft is of proportionately limited value. Stated slightly differently, the weather, operations, maintenance, and pilot information collected and transmitted to the ground from an individual aircraft may be of little or no use to the operator of that aircraft.

While there may be limited benefit to informing a flight crew what it already knows, benefit may accrue to other aircraft that may be about to enter a particular airspace where the data was collected. This may be especially true for operators with only a few aircraft. While airlines with large fleets may be able to justify the collection of weather, operations, maintenance, and pilot information to benefit their own fleet of aircraft that will be following a collector aircraft, operators are unlikely or unwilling to bear the cost of collecting information that will only benefit others. Similarly, operators will have the greatest need for up-to-date information when flying, and yet are least likely to have detailed real-time weather, operations, maintenance, and pilot information from other aircraft operating in the same airspace.

Hence, there is a need for a system for collaboratively collecting and distributing aviation information to aircraft on an as-needed only basis. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft data processing system includes a data receiver, a data transmitter, and a data processor. The data receiver is adapted to receive aircraft data transmitted from a plurality of subscribing aircraft. The data transmitter is configured to selectively transmit actionable aircraft data to one or more subscribing aircraft. The data processor is in operable communication with the data receiver and the data transmitter. The data processor is configured to: determine which of the one or more subscribing aircraft should receive actionable aircraft data, determine when and how often the one or more subscribing aircraft should receive actionable aircraft data, generate actionable aircraft data from at least a portion of the received aircraft data and based on the determination of which of the one or more subscribing aircraft should receive actionable aircraft data, and supply the generated actionable aircraft data to the data transmitter for transmission to each of the one or more subscribing aircraft that should receive the actionable aircraft data.

In another embodiment, a collaborative aviation information collection and distribution system includes a plurality of aircraft data transmitters and an aircraft data processing system. Each aircraft data transmitter is disposed in a subscribing aircraft, and each aircraft data transmitter is configured to selectively transmit aircraft data associated with its subscribing aircraft. The aircraft data processing system is in operable communication with each of the aircraft data transmitters, and includes a data receiver, a data transmitter, and a data processor. The data receiver is adapted to receive aircraft data transmitted from each of the aircraft transmitters. The data transmitter is configured to selectively transmit actionable aircraft data to one or more of the subscribing aircraft. The data processor is in operable communication with the data receiver and the data transmitter. The data processor configured to: determine which of the one or more subscribing aircraft should receive actionable aircraft data, determine when and how often the one or more subscribing aircraft should receive actionable aircraft data, generate actionable aircraft data from at least a portion of the received aircraft data and based on the determination of which of the one or more subscribing aircraft should receive actionable aircraft data, and supply the generated actionable aircraft data to the data transmitter for transmission to each of the one or more subscribing aircraft that should receive the actionable aircraft data.

In still another embodiment, a collaborative aviation information collection and distribution system includes a plurality of actionable aircraft data receivers and an aircraft data processing system. Each actionable aircraft data receiver is adapted to be disposed in a different subscribing aircraft, and each actionable aircraft data receiver is configured to receive action aircraft data transmitted thereto. The aircraft data processing system is in operable communication with each of the actionable aircraft data receivers via a wireless communication channel. The aircraft data processing system includes a data receiver, a data transmitter, and a data processor. The data receiver is adapted to receive aircraft data transmitted from a plurality of aircraft. The data transmitter configured to selectively transmit the actionable aircraft data to one or more of the subscribing aircraft. The data processor is in operable communication with the data receiver and the data transmitter, the data processor configured to: determine which of the one or more subscribing aircraft should receive actionable aircraft data, determine when and how often the one or more subscribing aircraft should receive actionable aircraft data, generate actionable aircraft data from at least a portion of the received aircraft data and based on the determination of which of the one or more subscribing aircraft should receive actionable aircraft data, and supply the generated actionable aircraft data to the data transmitter for transmission to each of the one or more subscribing aircraft that should receive the actionable aircraft data.

In yet still another embodiment, a method of collaborative aviation information collection and distribution includes receiving, in a data receiver, aircraft data from one or more subscribing aircraft; generating, in a processor, actionable aircraft data based at least in part on the received aircraft data; determining, using the processor, (i) which subscribing aircraft should receive the actionable aircraft data and (ii) a time that the subscribing aircraft should receive the actionable aircraft data; and supplying the actionable aircraft data from the processor to a data transmitter for transmission, at the appropriate time, to the one or more subscribing aircraft that should receive the actionable aircraft data.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
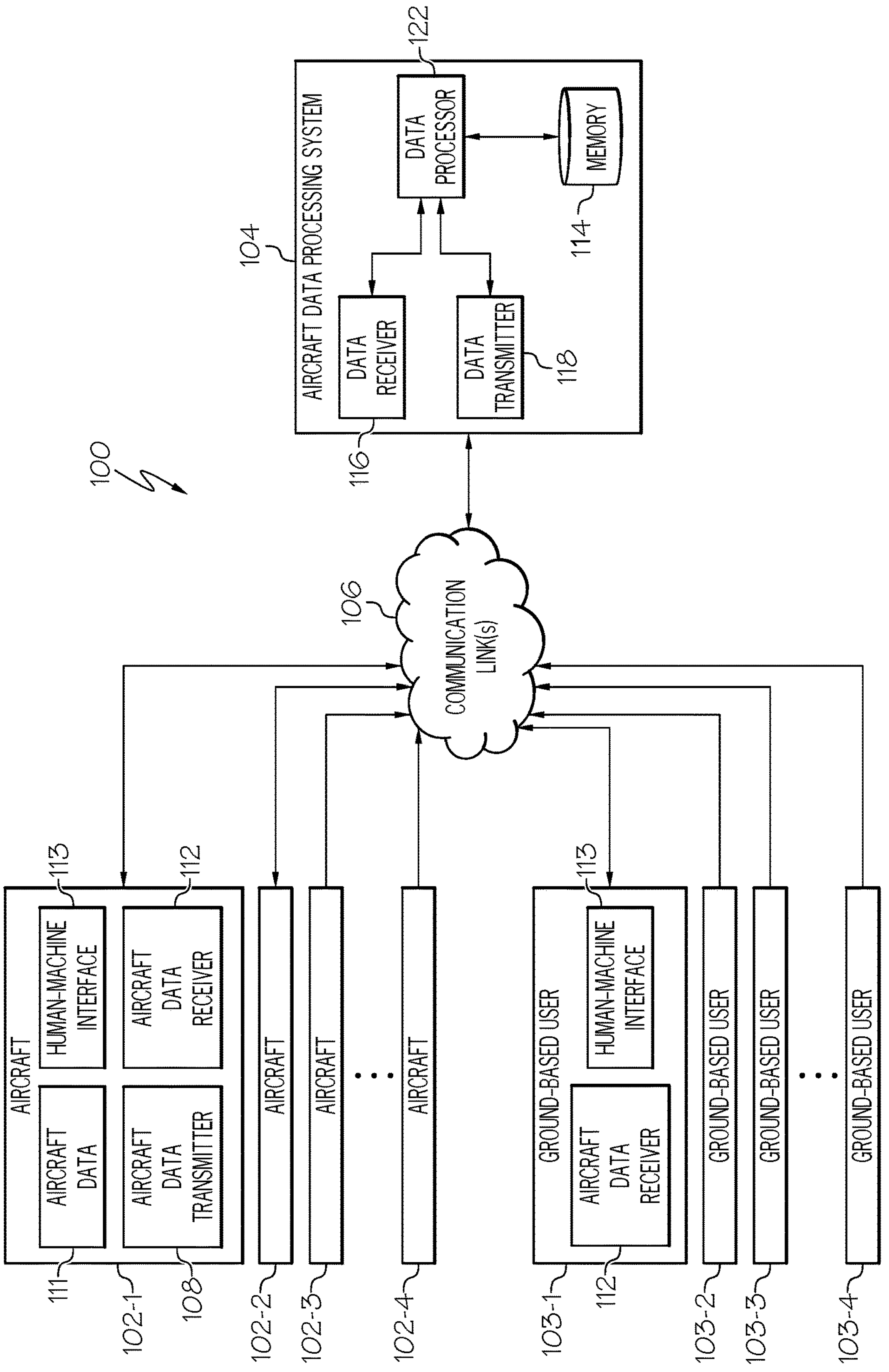
FIG. 1 depicts an embodiment of a collaborative aviation information collection and distribution system.

Referring to FIG. 1, an embodiment of a collaborative aviation information collection and distribution system is depicted. The depicted system 100 includes one or more aircraft 102 (102-1, 102-2, 102-3 . . . 102-N), one or more ground-based users 103 (e.g., 103-1, 103-2, 103-3 . . . 103-N), an aircraft data processing system 104, and a communication link 106. The aircraft 102 may be any one of numerous aircraft types and configurations. Each aircraft 102 is, however, a subscribing aircraft. As used herein, the term subscribing aircraft refers to an aircraft that has agreed to transmit aircraft data to, and receive actionable aircraft data (described further below) from, the aircraft data processing system 104.

Each subscribing aircraft 102 has an aircraft data transmitter 108 (only one depicted) and an actionable aircraft data receiver 112 (only one depicted) disposed therein. Each aircraft data transmitter 108 is coupled to receive aircraft data from one or more aircraft data sources 111. The aircraft data sources 111, which are disposed in or on each subscribing aircraft 102, may be variously configured and implemented. Some non-limiting examples of aircraft data sources 111 include one or more sensors, one or more avionics systems, and one or more engine systems, just to name a few. Each aircraft data transmitter 108 is configured to selectively transmit the aircraft data that is supplied thereto from aircraft data sources 111 to the aircraft data processing system 104, and each actionable aircraft data receiver is configured to receive actionable aircraft data that is transmitted thereto by the aircraft data processing system 104.

The actionable aircraft data received by an actionable aircraft data receiver 112 may need to be presented to a flight crew using one or more human-machine interfaces 113. The human-machine interfaces may vary, and may include any one of numerous audio devices, any one of numerous visual devices, or combinations of both. Regardless of the specific implementation, the human-machine interfaces 113 in each subscribing aircraft 102 are in operable communication with the actionable data receiver 112 and are configured to selectively generate user feedback (audio, visual, or both) representative of the received actionable aircraft data.

The type of aircraft data that each subscribing aircraft 102 collects and transmits may vary, but will preferably include data that may be useful to one or more of the other subscribing aircraft 102 or one or more of the subscribing ground-based users 103. Some non-limiting examples of aircraft data include aircraft identifying information (e.g., tail number, flight number), aircraft flight plan, aircraft location, environmental conditions, runway conditions, braking effectiveness, ground taxi times, active runways, and aircraft maintenance and aircraft health.

The subscribing ground-based users 103 may also vary, both in location and type. Some non-limiting examples of ground-based users 103 include schedulers, logisticians, maintenance and operations planners, and concierge service providers. Regardless of the particular type and location, each ground-based user 103 is a subscribing ground-based user. As used herein, the term subscribing ground-based user refers to a ground-based user that has agreed to receive actionable aircraft data from the aircraft data processing system 104. As FIG. 1 depicts, each subscribing ground-based user 103 is equipped with an actionable aircraft data receiver 112 and a human-machine interface 113.

The aircraft data processing system 104 is in operable communication with each of the aircraft data transmitters 108 via the communication link 106. It will be appreciated that the communication link 106 may be variously configured and implemented. For example, the communication link 106 may be a satellite link, a cellular link, a WiFi link, or a radio frequency (RF) link, or in the case of subscribing ground-based users 103 an internet link, just to name a few.

The aircraft data processing system 104 is configured, upon receipt of the aircraft data, to fuse the data, using known data fusion algorithms, and generate actionable aircraft data. The aircraft data processing system 104 is also configured to selectively transmit actionable aircraft data to one or more of the subscribing aircraft 102 and to one or more subscribing ground-based users 103. Before proceeding further, it is noted that the term actionable aircraft data, as used herein, means data that may alert a flight crew to take an action. For example, the actionable aircraft data may alert the flight crew to change all or portion of a current flight plan, to change an arrival gate or runway, to order a replacement part, or it may be provided to passengers to enable passengers to request services related to flight or weather changes, just to name a few.

To implement the above-described functionality, and as FIG. 1 further depicts, the aircraft data processing system 104 includes memory 114, a data receiver 116, a data transmitter 118, and a data processor 122. The memory 114 has various data stored therein. These data may vary, but include at least user preference data. The user preference data includes data representative of each subscribing aircraft 102, data representative of when and how often each particular subscribing aircraft 102 or subscribing ground-based user 103 would like to receive actionable aircraft data, and data representative of particular types of actionable aircraft data that each subscribing aircraft 102 or subscribing ground-based user 103 is subscribed to receive. As to the latter, it may be appreciated that some subscribing aircraft 102 or subscribing ground-based users 103 may subscribe to receive only a subset of the actionable aircraft data that are generated, whereas others may subscribe to receive all appropriate actionable aircraft data.

The data receiver 116 is coupled to receive the aircraft data that are transmitted from each of the aircraft data transmitters 108, and is configured to supply the received aircraft data to the data processor 122. The data transmitter 118 is coupled to receive actionable aircraft data from the data processor 122 and is configured to selectively transmit actionable aircraft data to one or more of the subscribing aircraft 102 or one or more of the subscribing ground-based users 103. The data receiver 116 may be implemented using any one of numerous known data receiver technologies. Similarly, the transmitter 118 may be implemented using any one of numerous known data transmitter technologies.

The data processor 122 is in operable communication with the memory 112, the data receiver 116, and the data transmitter 118. The data processor 122 is configured, upon receipt of the aircraft data from the data receiver 116, to generate actionable aircraft data from at least a portion of the received aircraft data. The data processor 122 is further configured to selectively access the memory 112 and, based at least in part on the user preference data stored in the memory 112, to determine which of the one or more subscribing aircraft 102 or one or more subscribing ground-based users 103 should receive actionable aircraft data, and determine when the one or more subscribing aircraft 102 or one or more subscribing ground-based users 103 should receive actionable aircraft data. The data processor 122, based on the determination of which of the one or more subscribing aircraft or one or more subscribing ground-based users 103 should receive actionable aircraft data, supplies the generated actionable aircraft data to the data transmitter 118 for transmission to the subscribing aircraft 102 or subscribing ground-based user 103, based on the user preference data.

Figure 2:
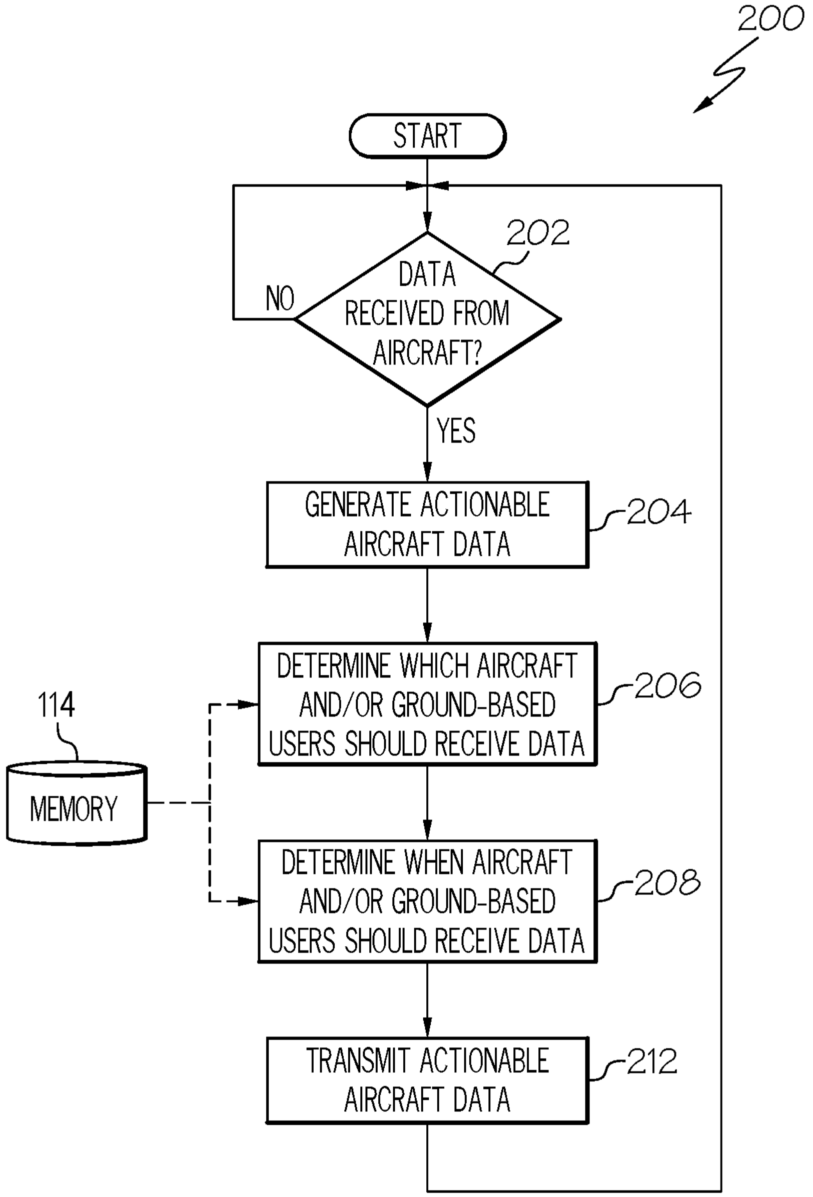
FIG. 2 depicts a process, in flowchart form, that may be implemented by at least a portion of the system depicted in FIG. 1.

For completeness, an embodiment of a process 200 that is implemented within the aircraft data processing system 104 is depicted in FIG. 2 in flowchart form, and will now be briefly described. When the process 200 begins (201), a determination is made as to whether or not aircraft data has been received from one or more subscribing aircraft 102 (202). If so, then the data processor 122 generates actionable aircraft data (204). The data processor 122, based on the user preference data stored in the memory 114, determines which subscribing aircraft 102 or subscribing ground-based users 103 should receive the actionable aircraft data (206) and when it should receive the actionable aircraft data (208). The data processor 122 then supplies the actionable aircraft data to the data transmitter 118 for transmission at the appropriate time (212). This process 200 then continuously repeats.

The system and method described herein collaboratively collects and distributes aviation information to aircraft or subscribing ground-based users 103 on an as-needed only basis.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as “connect” or “coupled to” used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft data processing system, comprising:

a data receiver adapted to receive aircraft data transmitted from a plurality of subscribing aircraft;

a data transmitter configured to selectively transmit actionable aircraft data to one or more subscribing aircraft; and a data processor in operable communication with the data receiver and the data transmitter, the data processor configured to:

determine which of the one or more subscribing aircraft should receive actionable aircraft data, determine when and how often the one or more subscribing aircraft should receive actionable aircraft data, generate actionable aircraft data from at least a portion of the received aircraft data and based on the determination of which of the one or more subscribing aircraft should receive actionable aircraft data, and supply the generated actionable aircraft data to the data transmitter for transmission to each of the one or more subscribing aircraft that should receive the actionable aircraft data.

2. The aircraft data processing system of claim 1, further comprising:

memory having user preference data stored therein, the memory in operable communication with the data processor, wherein the data processor is further configured to supply the generated actionable aircraft data to the data transmitter based on the user preference data.

3. The aircraft data processing system of claim 1, wherein the aircraft data includes one or more of aircraft identifying information, aircraft flight plans, and aircraft locations.

4. The aircraft data processing system of claim 3, wherein the aircraft data further includes one or more of environmental conditions, runway conditions, braking effectiveness, ground taxi times, active runways, and aircraft maintenance and aircraft health.

5. The aircraft data processing system of claim 1, wherein the actionable aircraft data comprise data that may alert a flight crew to take an action.

6. The aircraft data processing system of claim 1, wherein the data receiver is configured to receive the aircraft data via one or more wireless communication channels.

7. A collaborative aviation information collection and distribution system, comprising:

a plurality of aircraft data transmitters, each aircraft data transmitter adapted to be disposed in a subscribing aircraft, each aircraft data transmitter configured to selectively transmit aircraft data associated with its subscribing aircraft; and an aircraft data processing system in operable communication with each of the aircraft data transmitters, the aircraft data processing system including:

a data receiver adapted to receive aircraft data transmitted from each of the aircraft transmitters;

a data transmitter configured to selectively transmit actionable aircraft data to one or more of the subscribing aircraft; and a data processor in operable communication with the data receiver and the data transmitter, the data processor configured to:

determine which of the one or more subscribing aircraft should receive actionable aircraft data, determine when and how often the one or more subscribing aircraft should receive actionable aircraft data, generate actionable aircraft data from at least a portion of the received aircraft data and based on the determination of which of the one or more subscribing aircraft should receive actionable aircraft data, and supply the generated actionable aircraft data to the data transmitter for transmission to each of the one or more subscribing aircraft that should receive the actionable aircraft data.

8. The collaborative aviation information collection and distribution system of claim 7, further comprising:

a plurality of actionable aircraft data receivers, each actionable aircraft data receiver adapted to be disposed in one of the subscribing aircraft, each actionable aircraft data receiver configured to receive action aircraft data transmitted thereto.

9. The collaborative aviation information collection and distribution system of claim 8, further comprising:

a plurality of human-machine interfaces, each human-machine interface in operable communication with a different one of the actionable data receivers and configured to generate feedback representative of the received actionable aircraft data.

10. The collaborative aviation information collection and distribution system of claim 7, wherein:

the aircraft data processing system further comprises memory having user preference data stored therein, the memory in operable communication with the data processor; and the data processor is further configured to supply the generated actionable aircraft data to the data transmitter based on the user preference data.

11. The collaborative aviation information collection and distribution system of claim 7, wherein the aircraft data includes one or more of aircraft identifying information, aircraft flight plans, and aircraft locations.

12. The collaborative aviation information collection and distribution system of claim 11, wherein the aircraft data further includes one or more of environmental conditions, runway conditions, braking effectiveness, ground taxi times, active runways, and aircraft maintenance and aircraft health.

13. The collaborative aviation information collection and distribution system of claim 7, wherein the actionable aircraft data comprise data that may alert a flight crew to take an action.

14. The collaborative aviation information collection and distribution system of claim 1, wherein the data receiver is configured to receive the aircraft data via one or more wireless communication channels.

15. A collaborative aviation information collection and distribution system, comprising:

a plurality of actionable aircraft data receivers, each actionable aircraft data receiver adapted to be disposed in a different subscribing aircraft, each actionable aircraft data receiver configured to receive action aircraft data transmitted thereto; and an aircraft data processing system in operable communication with each of the actionable aircraft data receivers via a wireless communication channel, the aircraft data processing system including:

a data receiver adapted to receive aircraft data transmitted from a plurality of aircraft;

a data transmitter configured to selectively transmit the actionable aircraft data to one or more of the subscribing aircraft; and a data processor in operable communication with the data receiver and the data transmitter, the data processor configured to:

determine which of the one or more subscribing aircraft should receive actionable aircraft data, determine when and how often the one or more subscribing aircraft should receive actionable aircraft data, generate actionable aircraft data from at least a portion of the received aircraft data and based on the determination of which of the one or more subscribing aircraft should receive actionable aircraft data, and supply the generated actionable aircraft data to the data transmitter for transmission to each of the one or more subscribing aircraft that should receive the actionable aircraft data.

16. The collaborative aviation information collection and distribution system of claim 15, further comprising:

a plurality of aircraft data transmitters, each aircraft data transmitter disposed in a subscribing aircraft, each aircraft data transmitter configured to receive aircraft data from a plurality of sensors disposed in the subscribing aircraft and to selectively transmit the aircraft data.

17. The collaborative aviation information collection and distribution system of claim 15, wherein the aircraft data includes one or more of aircraft identifying information, aircraft flight plans, and aircraft locations.

18. The collaborative aviation information collection and distribution system of claim 17, wherein the aircraft data further includes one or more of environmental conditions, runway conditions, braking effectiveness, ground taxi times, active runways, and aircraft maintenance and aircraft health.

19. The collaborative aviation information collection and distribution system of claim 15, wherein the actionable aircraft data comprise data that may alert a flight crew to take an action.

* * * * *